(12) United States Patent
Anderson (10) Patent No.: US 10,533,860 B2
(45) Date of Patent: Jan. 14, 2020

(54) LIGHT PATTERN BASED VEHICLE LOCATION DETERMINATION METHOD AND APPARATUS

(71) Applicant: Intel Corporation, Santa Clara, CA (US)

(72) Inventor: Glen J. Anderson, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 112 days.

(21) Appl. No.: 15/846,838

(22) Filed: Dec. 19, 2017

(65) Prior Publication Data

US 2019/0049251 A1   Feb. 14, 2019

(51) Int. Cl.
| | | |
|---|---|---|
| *G01C 21/28* | (2006.01) | |
| *G05D 1/02* | (2006.01) | |
| *G06T 7/70* | (2017.01) | |
| *G01S 19/14* | (2010.01) | |
| *G08G 1/04* | (2006.01) | |
| *B60Q 1/26* | (2006.01) | |
| *H04N 7/18* | (2006.01) | |
| *G08G 1/017* | (2006.01) | |

(52) U.S. Cl.
CPC ............. *G01C 21/28* (2013.01); *B60Q 1/26* (2013.01); *G01S 19/14* (2013.01); *G05D 1/0246* (2013.01); *G05D 1/0278* (2013.01); *G06T 7/70* (2017.01); *G08G 1/017* (2013.01); *G08G 1/0175* (2013.01); *G08G 1/04* (2013.01); *H04N 7/181* (2013.01); *H04N 7/185* (2013.01)

(58) Field of Classification Search
USPC ........................................ 701/469
See application file for complete search history.

(56) References Cited

U.S. PATENT DOCUMENTS

| | | | |
|---|---|---|---|
| 10,082,562 B1* | 9/2018 | Abari | G01S 7/006 |
| 2017/0120804 A1* | 5/2017 | Kentley | G05D 1/0088 |
| 2017/0317748 A1* | 11/2017 | Krapf | H04B 10/116 |
| 2018/0210465 A1* | 7/2018 | Qu | G06T 7/74 |
| 2018/0345971 A1* | 12/2018 | Birnschein | B60L 58/10 |
| 2019/0049251 A1* | 2/2019 | Anderson | G01C 21/28 |
| 2019/0259182 A1* | 8/2019 | Sarukkai | G06F 16/29 |

* cited by examiner

*Primary Examiner* — Tyler D Paige
(74) *Attorney, Agent, or Firm* — Schwabe, Williamson & Wyatt, P.C.

(57) ABSTRACT

The present disclosure may be directed to a computer-assisted or autonomous driving (CA/AD) vehicle with a controller to control one or more light emitters to produce a light pattern that uniquely identify the vehicle. It may also be directed to a system to receive image data from one or more video cameras located in a location vicinity of the CA/AD vehicle emitting a pattern of light, and to analyze the received image data to determine a physical location of the vehicle.

10 Claims, 7 Drawing Sheets

LIGHT PATTERN BASED VEHICLE LOCATION DETERMINATION METHOD AND APPARATUS

FIELD

Embodiments of the present disclosure generally relate to the field of computer-assisted or autonomous driving (CA/AD). More specifically, embodiments of the present disclosure relate to devices and processes for accurately determining the location of a vehicle by correlating global positioning system (GPS) data and video images of the vehicle.

BACKGROUND

GPS location data may be used to determine the location of a vehicle on a roadway and may be used to track the speed and direction of the vehicle. This data may be used in the vehicle's navigation system, among other applications. Locations of a plurality of vehicles on a roadway may be used to identify current or predict future travel characteristics along roadways. Examples of applications that use GPS in this way are Google™ Waze™ or Apple® Maps. With these applications, users may opt-in and share their GPS location with the application, and receive warnings such as traffic congestion on their driving routes.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Road infrastructure-based cameras may be located along highways, on bridges, or in tunnels. These cameras can monitor traffic and enable capture and broadcast of video images of troubled road conditions. Machine vision algorithms, using video images from one or more cameras, can estimate traffic congestion, and visual positioning of vehicles.

This disclosure may include systems, processes, and apparatuses for accurately detecting the location of a vehicle. Embodiments may disclose a controller for a vehicle, which may be a CA/AD vehicle, that may work in conjunction with a system to allow highway infrastructure video cameras to correlate GPS reports received from the vehicle with image data of the vehicle captured from the video cameras. A visual identifier, such as a light pattern, e.g., a blinking pattern, emitted from the vehicle, may be used to identify the vehicle on the image data. Then, an accurate physical location of the vehicle may be determined based on the image data.

In embodiments, the system may look up a list of vehicles in the vicinity of one or more video cameras, based on regular reporting of each vehicle's GPS location to the system. The system may then identify the vehicles in the vicinity by requesting that each vehicle emit its unique light pattern. The system may then compare the light patterns to a list of vehicle identifiers. The system may then determine, from captured image data of the vehicles, an accurate physical location of each vehicle.

In embodiments, the system may receive a request from a vehicle for the vehicle's own accurate location. The system may send a request to the vehicle to emit its identifying light pattern and, based upon the vehicle's reporting of GPS location, may determine one or more video cameras that may be able to capture image data of the vehicle. Based upon the identifying light pattern of the vehicle in the image data, the system may identify the vehicle and, using the same image data, determine an accurate physical location of the vehicle.

Although GPS is commonly used for location applications and traffic prediction applications such as Google Waze or Apple Maps, location information from GPS is not highly precise and can be off by multiple meters. GPS data also has an inherent lag that affects accuracy. Without accurate location information, the vehicle may, for example, miss a freeway exit, particularly when travelling at high rates of speed.

Embodiments related to determining vehicle location may be used for purposes other than route navigation. For example, embodiments may allow more accurate identification and positioning of a vehicle than GPS alone for other purposes such as detecting cars swerving in an area that may indicate a safety hazard. Embodiments may include non-automotive moving objects such as drones, and may be used for mobile devices generally, factory equipment, person identification, or CA/AD vehicle monitoring and testing.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices that cooperate and/or interact through one or more network linkages such as wired and/or wireless networks. By way of example and not limitation, a computing apparatus may include two or more computing devices "coupled" on a motherboard or by one or more network linkages.

The term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The term "computer-readable storage media" may refer to, be a part of, or otherwise include media on which data, including instructions of a module that may be executed, may reside. Computer-readable storage media may be either transitory or non-transitory.

As used herein, the term "semi-autonomous driving" is synonymous with computer-assisted driving. The term does not mean exactly 50% of the driving functions are automated. The percentage of driving functions automated may be a fraction of a percent to almost 100%.

Various operations are described as multiple discrete operations in turn, in a manner that is most helpful in understanding the claimed subject matter. However, the order of description should not be construed as to imply that these operations are necessarily order dependent.

Figure 1:
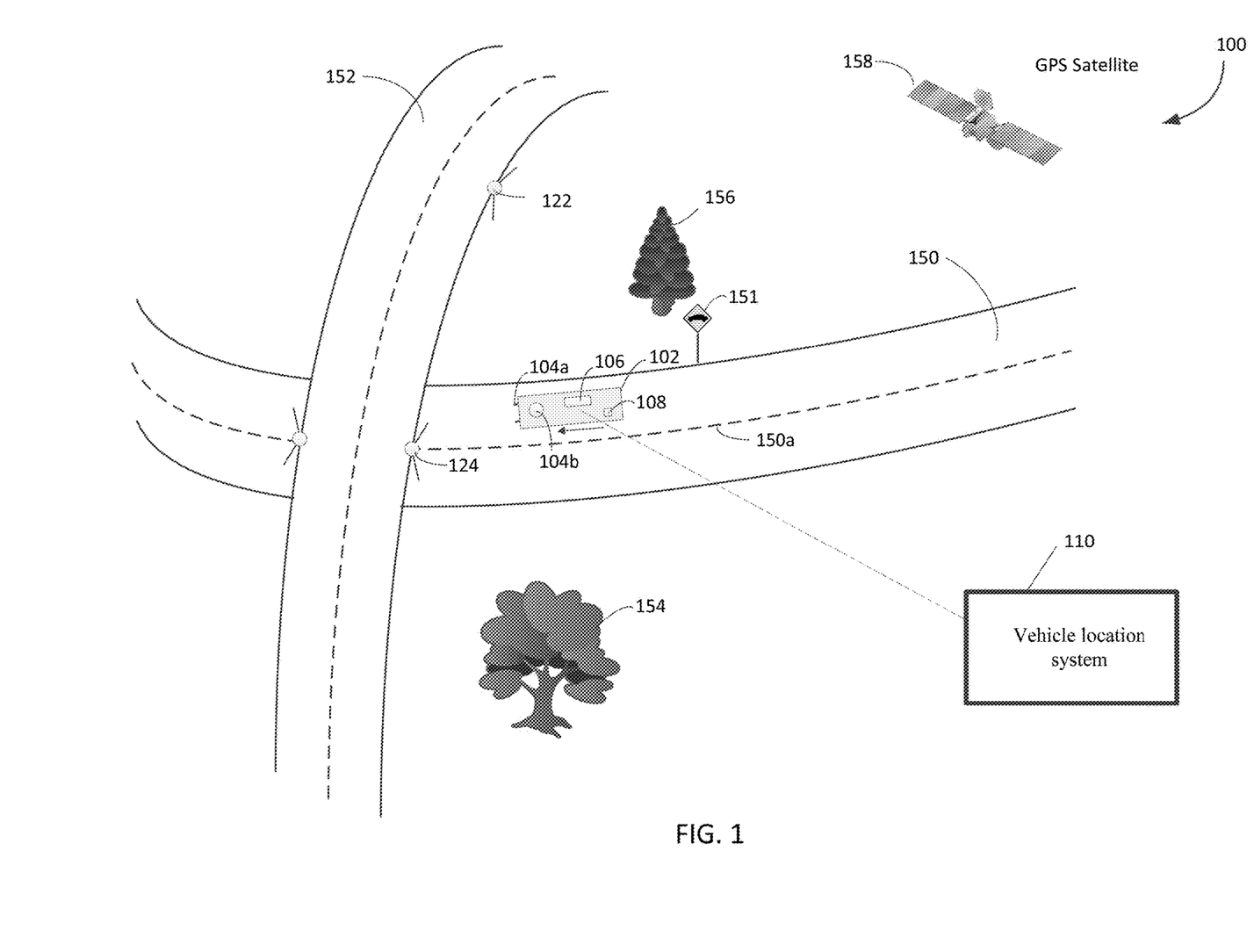
FIG. 1 shows a context diagram with a CA/AD vehicle interacting with a vehicle location system to identify an accurate vehicle location, in accordance with various embodiments.

FIG. 1 shows a context diagram with a CA/AD vehicle interacting with a vehicle location system to identify an accurate vehicle location, in accordance with various embodiments. Diagram 100 shows a scenario of a CA/AD vehicle 102 (hereinafter, this may also simply be referred to as vehicle) traveling on a highway 150 that may be in view of infrastructure video cameras 122, 124. The vehicle 102 may include a light source such as headlights 104a or a separate light emitter 104b to emit a light pattern, e.g., a blinking light pattern or a strobing. In embodiments, the infrastructure-based cameras 122, 124 may capture the light pattern as well as images of the vehicle 102 on the highway 150. The vehicle 102 may also include a controller 106 that may interact with the vehicle location system 110, via, e.g., wireless communication, and may also control the light pattern of headlights 104a or light emitter 104b. Vehicle 102 may also include a GPS receiver 108 in communication with one or more GPS satellite 158. The controller 106 may also receive GPS positioning data for the vehicle 102 from the GPS receiver 108 and send that data to the vehicle location system 110 along with an identification of the vehicle 102 on a one-time or a regular basis. The controller 106 may also send or receive the pattern of lights that may be unique to vehicle 102, along with a vehicle 102 identifier, to or from the vehicle location system 110.

The vehicle location system 110 may identify, based upon the latest GPS data received from vehicle 102, a list of video cameras 122, 124 that may be able to capture image data of the vehicle 102. The vehicle location system 110 may then analyze the image data by identifying the light pattern associated with vehicle 102 and based on the image data analysis, determine a location of the vehicle 102 that is more accurate than GPS location. The vehicle location system 110 may then send the more accurate location to vehicle 102 for it to use, for example, for navigation and routing.

In diagram 100, as vehicle 102 travels along a highway 150 in a direction toward an overpass 152, video cameras 122, 124 may be positioned on the overpass 152 and able to capture image data of an area that includes vehicle 102. In embodiments, video cameras 122, 124 may be infrastructure cameras positioned anywhere along a roadway to capture traffic flow or other traffic-related activity. The video cameras 122, 124 may transmit image data, in addition to other data. In embodiments, the video cameras 122, 124 may have the ability to pan, zoom, tilt, and/or otherwise change their orientation, and may also operate at one or more frame rates, pixel densities, or optical settings. The video cameras 122, 124 may be able to capture this other data and/or metadata and include it with the image data sent to the vehicle location system 110. In embodiments, the cameras 122, 124 may be stationary.

In embodiments, real-world positions of objects identified in the video captured by the cameras 122, 124 may be accurately determined based upon the analysis of the image data and/or associated other data or metadata. This analysis may include an image data analysis from a single video camera 124, or may include an image data comparison from multiple video cameras 122, 124 that have captured image data of the vehicle 102.

The analysis may also use images of other objects within a video camera 122, 124 field of view as reference points to determine the location of the vehicle 102. For example, a reference point may be a road marker, such as a stripe 150a painted on the highway 150, a road sign 151, a tree 154, a bush 156, or some other reference point. In embodiments, information about the orientation of the video camera 122, 124 in relation to the reference point may be used to identify the location of the vehicle 102.

The GPS receiver 108 within vehicle 102 may identify a location of the vehicle 102 by using signals from one or more GPS satellites 158. The controller 106 may either include or be coupled with a transceiver (e.g., communication interface 212 of FIG. 2) to transmit and/or receive data to and/or from the controller 106 and the vehicle location system 110.

In embodiments, the light source on the vehicle 102 may include headlights 104a attached to the vehicle 102 or may be a separate light emitter 104b. In embodiments, the light source may emit visible light, ultraviolet light, or infrared light. The light source may also be able to emit light in a light pattern (blinking, strobing, and so forth) associated with a unique identification for the vehicle 102. In various blinking embodiments, a blink may be extremely short or may be of any other length, and/or the blink may be executed at a specific time or have a specific timestamp.

Figure 2:
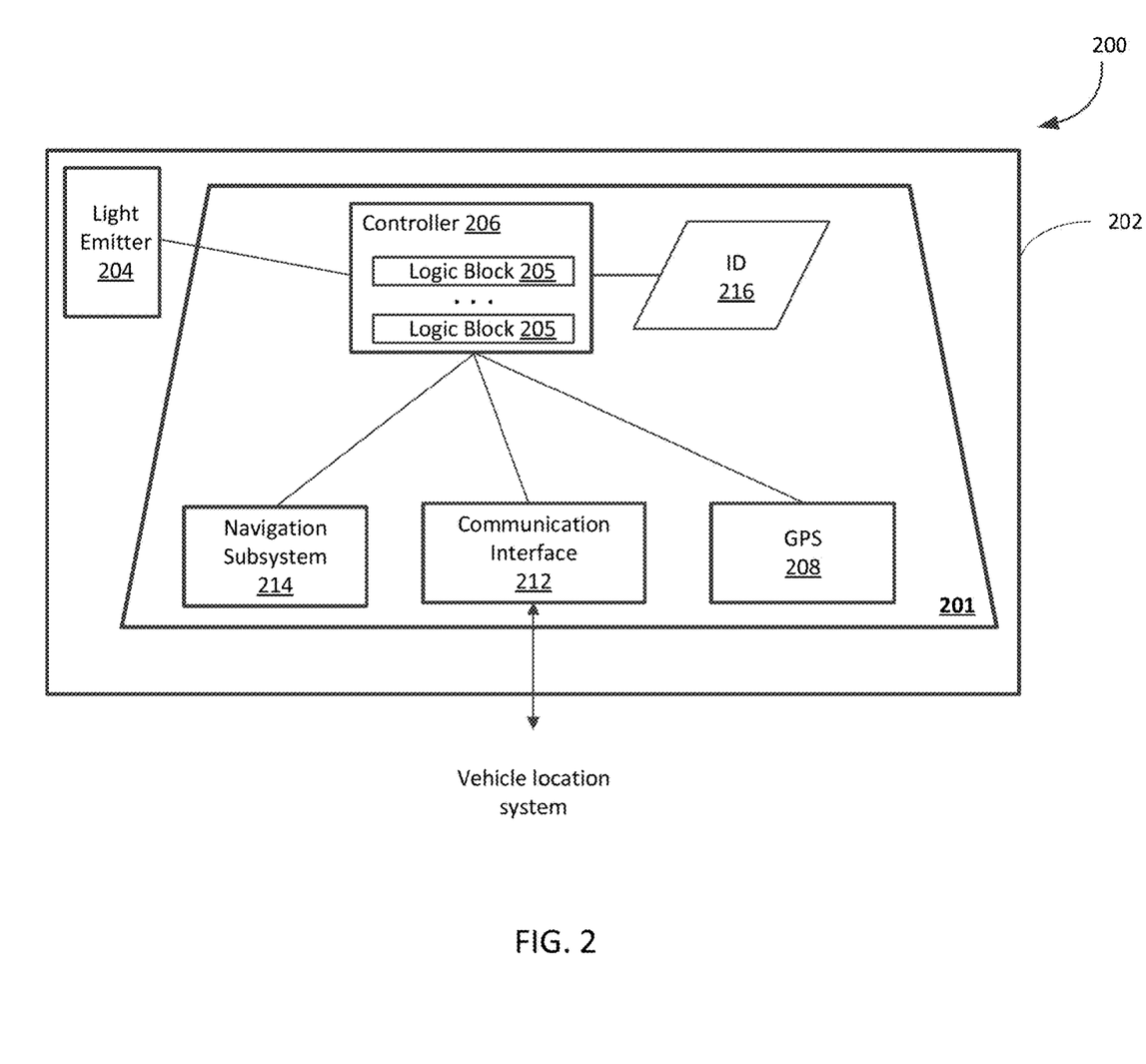
FIG. 2 illustrates a block diagram of an on board system of a vehicle that includes a controller to facilitate accurate vehicle location, in accordance with various embodiments.

FIG. 2 illustrates a block diagram of an on board system of a vehicle that includes a controller to facilitate accurate vehicle location, in accordance with various embodiments. Diagram 200 is a block diagram of components of an on board system 201 of a vehicle 202, which may be similar to vehicle 102 of FIG. 1. On board system 201 may include a controller 206, which may be similar to controller 106 of FIG. 1, that may receive data from a GPS 208, which may be similar to GPS receiver 108 of FIG. 1, and may also send and/or receive data via communication interface 212 to or from the vehicle location system 110 of FIG. 1. In embodiments, the controller 206 may also receive vehicle identification (ID) information 216. In embodiments, ID information 216 may be a unique number associated with vehicle 202 and may also be associated with a blinking light pattern.

In embodiments, the controller 206 may receive a request to initiate emitting of the identifying light pattern from a vehicle 202 driver, from the vehicle location system 110 via the communications interface 212, or from some other source. In response, the controller 206 having a number of logic blocks 205 may cause the light emitter 204, via one of its logic blocks 205, to emit the identifying light pattern that may be unique to the vehicle 202. Light emitter 204 may be similar to headlight 104a or light emitter 104b. An indication of the specific light pattern may be associated with the vehicle ID information 216. Similarly, when either initiated by the controller 206, when requested by the vehicle location system 110, or by some other source, the controller 206 may cause the light emitter 204, via, e.g., the same logic block, to stop emitting the light pattern.

The controller 206 may also receive vehicle 202 location information from a GPS receiver 208. The controller 206, or more specifically, another one of its logic blocks 205, may subsequently send the GPS-based location information, via, e.g., communication interface 212, along with identification information 216 of the vehicle 202, to the vehicle location system 110. In embodiments, the controller 206 may send this information on a frequent and/or regular basis, or on an intermittent basis, to the vehicle location system 110. The vehicle location system 110 may use this information to determine a general vicinity in which the vehicle 202 may be located, and therefore determine which infrastructure video cameras 122, 124 may capture image data of the identifying light pattern emitted from vehicle 202. From this information, the location of vehicle 202 may be more accurately determined.

The controller 206 may also receive, from the vehicle location system 110, via, e.g., the communication interface 212, the more accurately determined location of the vehicle 202. The controller 206 may then send this vehicle 202 more accurate location information to another application operating within vehicle 202, such as a navigation subsystem 214, to provide more accurate navigation guidance to the vehicle driver or to the CA/AD system of the vehicle 202.

In embodiments, controller 206 may be implemented in hardware, software, or a combination thereof. Hardware implementations may include ASIC or programmable circuits endowed with the above-described logic of the logic blocks 205. Software implementations may include a processor, memory and instructions embodied in the above described logic of the logic blocks 205.

Figure 3:
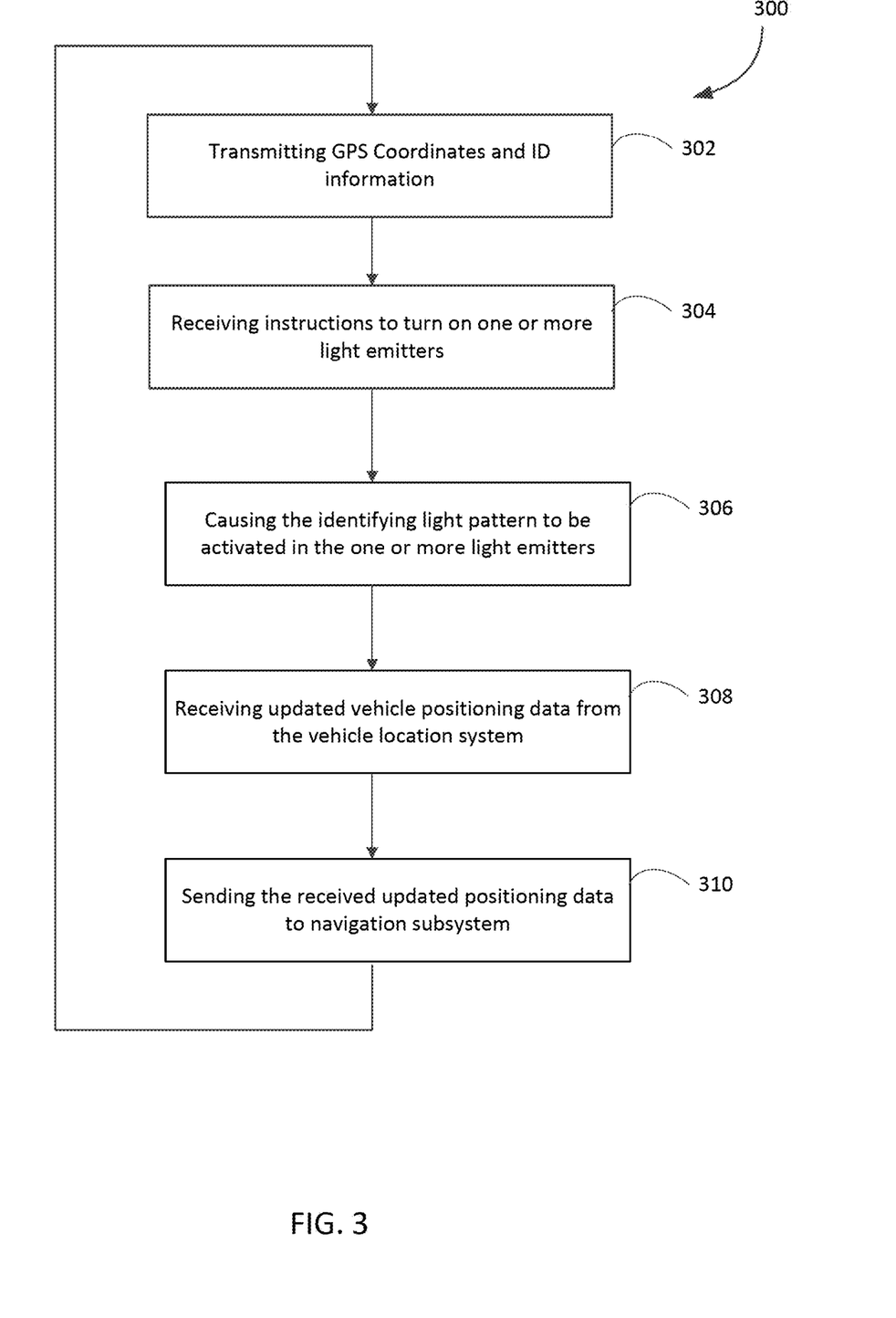
FIG. 3 illustrates an example process for a controller in a CA/AD vehicle, in accordance with various embodiments.

FIG. 3 illustrates an example process for a controller in a CA/AD vehicle, in accordance with various embodiments. The process 300 may be performed, for example, by the controller 206 of FIG. 2, or by a system 600 (e.g., computing device) configured to implement a controller, as described in reference to FIGS. 1-5.

The process 300 may begin at block 302, and may include transmitting GPS coordinates and ID information of a vehicle such as vehicle 102 of FIG. 1 or 202 of FIG. 2. In embodiments, this information may be transmitted to a vehicle location system 110. In embodiments, the controller 206 may receive GPS coordinates and ID information from GPS receiver 208 and ID information 216 of FIG. 2 respectively. In embodiments, transmitting may be initiated by the vehicle 202, by a command received via communication interface 212, for example, from a vehicle location system 110, or by a command received from some other source. Transmitting GPS coordinates may also include transmitting a timestamp indicating when the GPS coordinates were captured. The ID information 216 may include a unique identifier that may be used to associate the vehicle 202 with an identifying light pattern that may be unique to the vehicle 202. In embodiments, the unique identifier may be a fixed value such as a serial number associated with the vehicle 202, or it may be determined based upon use characteristics of or the location of the vehicle 202 at a particular time.

At block 304, the process may include receiving instructions to turn on one or more light emitters. The instructions may be received by the controller 206 from the vehicle location system. In embodiments, the communication interface 212 may receive the instructions from the vehicle location system and pass the instructions to the controller 206.

At block 306, the process may include causing the identifying light pattern to be activated in the one or more light emitters. In embodiments, this may cause either the headlights 104a or the light emitter 104b of FIG. 1 to emit an identifying light pattern. The identifying light pattern may be a simple flash of lights, or may be a code to identify the vehicle 202 on the image data captured from video cameras 122, 124 of FIG. 1. The pattern of light emitting may continue for a determined period of time, or until a command is received by the controller 206 to stop the emitting.

At block 308, the process may include receiving updated vehicle positioning data from the vehicle location system. The updated vehicle positioning data may be determined as described above by analyzing image data of the vehicle 202. In embodiments, the updated vehicle positioning data may be received by communication interface 212.

At block 310, the process may include sending the received updated, more accurate, position data to a navigation subsystem. In embodiments, the navigation subsystem may be the navigation subsystem 214 of FIG. 2. The process 300 may then return to block 302.

Figure 4:
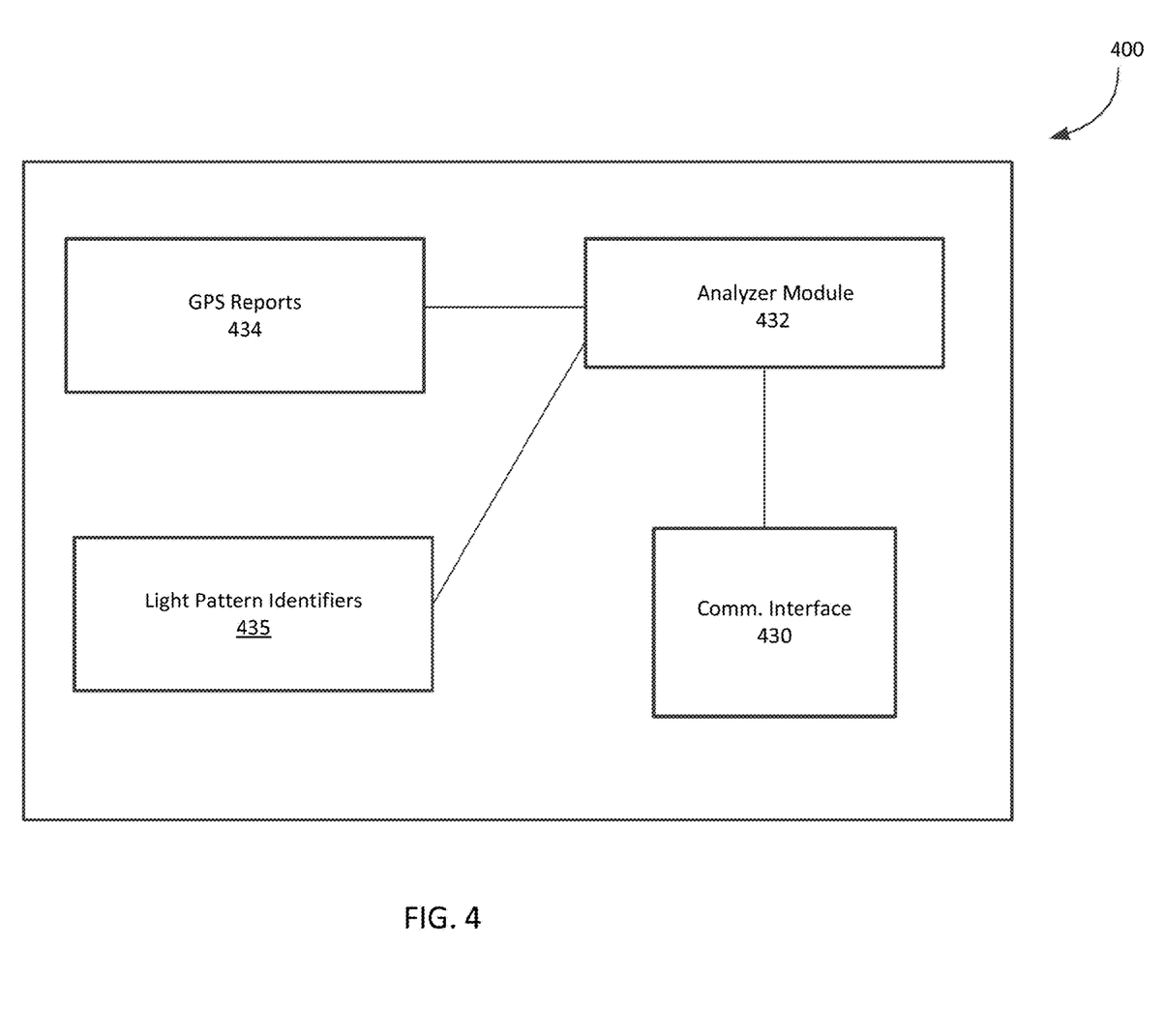
FIG. 4 illustrates a block diagram of a vehicle location system, in accordance with various embodiments.

FIG. 4 illustrates a block diagram of a vehicle location system, in accordance with various embodiments. Diagram 400 is a block diagram of components of a vehicle location system, which may be similar to the vehicle location system 110 of FIG. 1. In embodiments, the vehicle location system of diagram 400 may interact with a plurality of vehicles, such as vehicle 202 of FIG. 2.

The communication interface 430 may receive and send data between the vehicle location system 400 and a vehicle 102, cameras 122, 124, and/or other applications, such as a traffic analysis application, that may use accurate positioning information for a plurality of vehicles 102. The communication interface 430 component may receive periodic GPS reports from a vehicle 102 and store that information in a GPS reports 434 component. In embodiments, the GPS reports may include the GPS location, identification of the vehicle 102, and/or a timestamp corresponding to the GPS report location. The communication interface 430 component may also receive blinking light pattern information from one or more vehicles 102, which may be stored in a light pattern identifiers 435 component. The communication interface 430 may also receive video image data from one or more video cameras, such as video cameras 122, 124 of FIG. 1. These cameras 122, 124, may be infrastructure video cameras, or may be some other type of video camera. In embodiments, the analyzer module 432 may transmit a request for image data from video cameras 122, 124, that may be proximate to the vehicle 102 based upon information in the GPS reports 434 component.

The analyzer module 432 may take the received video image data from the one or more video cameras 122, 124, and analyze the video image data to identify a specific vehicle 102, and/or to determine an accurate physical location of the identified vehicle. The analyzer 432 may identify the location of the vehicle 102 by identifying a pattern of emitting lights in the image data, and based on information in the light pattern identifiers 435 component, identify the specific vehicle 102 in the image data. Then, the analyzer 432, using techniques described above, may determine a more accurate physical location of the vehicle 102.

In embodiments, the vehicle location system 400 may also transmit, via communication interface 430 component to the vehicle 202, a command to start emitting its identifying light pattern, and may also send to the vehicle 202 the vehicle's more accurate physical location. The vehicle location system 400, via the communication interface 430 component, may also transmit and receive data with other applications, for example, by receiving requests from the applications and transmitting to the applications the current and/or historical accurate physical location information for a plurality of vehicles including vehicle 202.

In various embodiments, the vehicle location system 400 may or may not include one or more of the components described above, or include other additional components.

Figure 5:
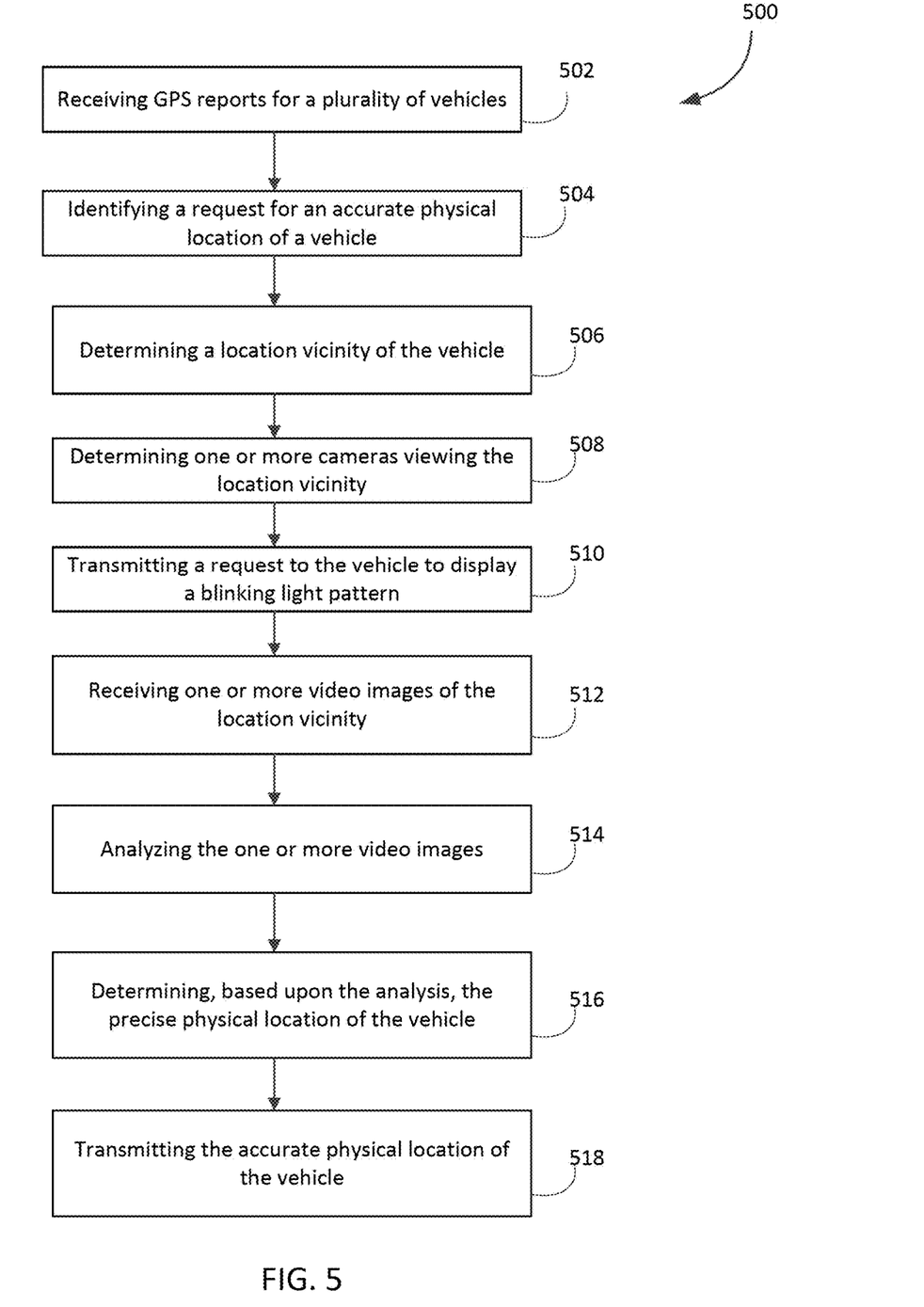
FIG. 5 illustrates an example process for implementing a vehicle location system, in accordance with various embodiments.

FIG. 5 illustrates an example process for implementing a vehicle location system, in accordance with various embodiments. Part or all of the process 500 may be performed, for example, by the vehicle location system 400 of FIG. 4, or by the system 600 (e.g., computing device) configured to implement the vehicle location system, as described in reference to FIGS. 1-5.

Process 500 may begin at block 502, and may include receiving GPS reports for a plurality of vehicles. In embodiments, a plurality of vehicles, for example, vehicle 102, may regularly transmit the vehicle 102 GPS position reports that may be associated with a vehicle identifier. The reports may also include a timestamp. This information may be received by the communication interface 430, and may be stored in the GPS reports 434 component of FIG. 4.

At block 504, the process may include identifying a request for a more accurate physical location of a vehicle. In embodiments, this request may come from a vehicle 102, from a driver of vehicle 102, or from some other application that may wish to identify a more accurate physical location of the vehicle 102.

At block 506, the process may include determining a location vicinity of the vehicle. In embodiments, a most recent GPS location of the vehicle 102 may be retrieved from the GPS reports 434 component of FIG. 4. From this most recent GPS location, a location vicinity may be determined in which the vehicle 102 may be located.

At block 508, the process may include determining one or more cameras viewing the location vicinity. In embodiments, the vehicle location system 400 may retrieve information on the location of one or more cameras 122, 124 that view the location vicinity of the vehicle GPS location. This camera location information (not shown) may be stored in the vehicle location system 400, or may be retrieved from an external source.

At block 510, the process may include transmitting a request to the vehicle to display its identifying light pattern. This may cause the vehicle 102 to emit a blinking, strobing or other varying light pattern from its light sources 104a, 104b so that the vehicle 102 may be identified on any video image that may be captured by cameras 122, 124. The identifying light patterns associated with the plurality of vehicles, such as vehicle 102, may be identified by accessing the data in the light pattern identifiers 435 component. In embodiments, the transmitted request may be for the vehicle 102 to quickly flash its identifying light pattern at a particular time, and then identify the vehicle 102 by the flashed identifying light pattern received in the video images at that time.

At block 512, the process may include receiving one or more video images of the location vicinity. In embodiments, the one or more video images may be received from cameras 122, 124.

At block 514, the process may include analyzing the one or more video images. In embodiments, the analyzer 432 component may analyze the video camera image data and also other related data and/or meta data using the processes and techniques described above.

At block 516, the process may include determining, based upon the analysis, the physical location of the vehicle. As discussed above, an accurate physical location of the vehicle 102 may be determined in a number of ways, for example, based upon triangulation analysis of multiple video images, or upon comparison of known landmarks within the video image that also contains an image of vehicle 102.

At block 518, the process may include transmitting the more accurate physical location of the vehicle. In embodiments, the more accurate physical location may be transmitted to the vehicle 102 for use by the vehicle's navigation subsystem 214 to provide navigation that is more accurate. In embodiments, the data may be sent to another application, for example, an application for infrastructure monitoring, for example, for monitoring swerving by vehicles 102 around a defect in a highway 150 where vehicle swerving may not be detected by collecting GPS coordinates of a plurality of vehicles alone.

It should be understood that the actions described in reference to FIG. 5 may not necessarily occur in the described sequence, and some of the actions may not be performed.

Figure 6:
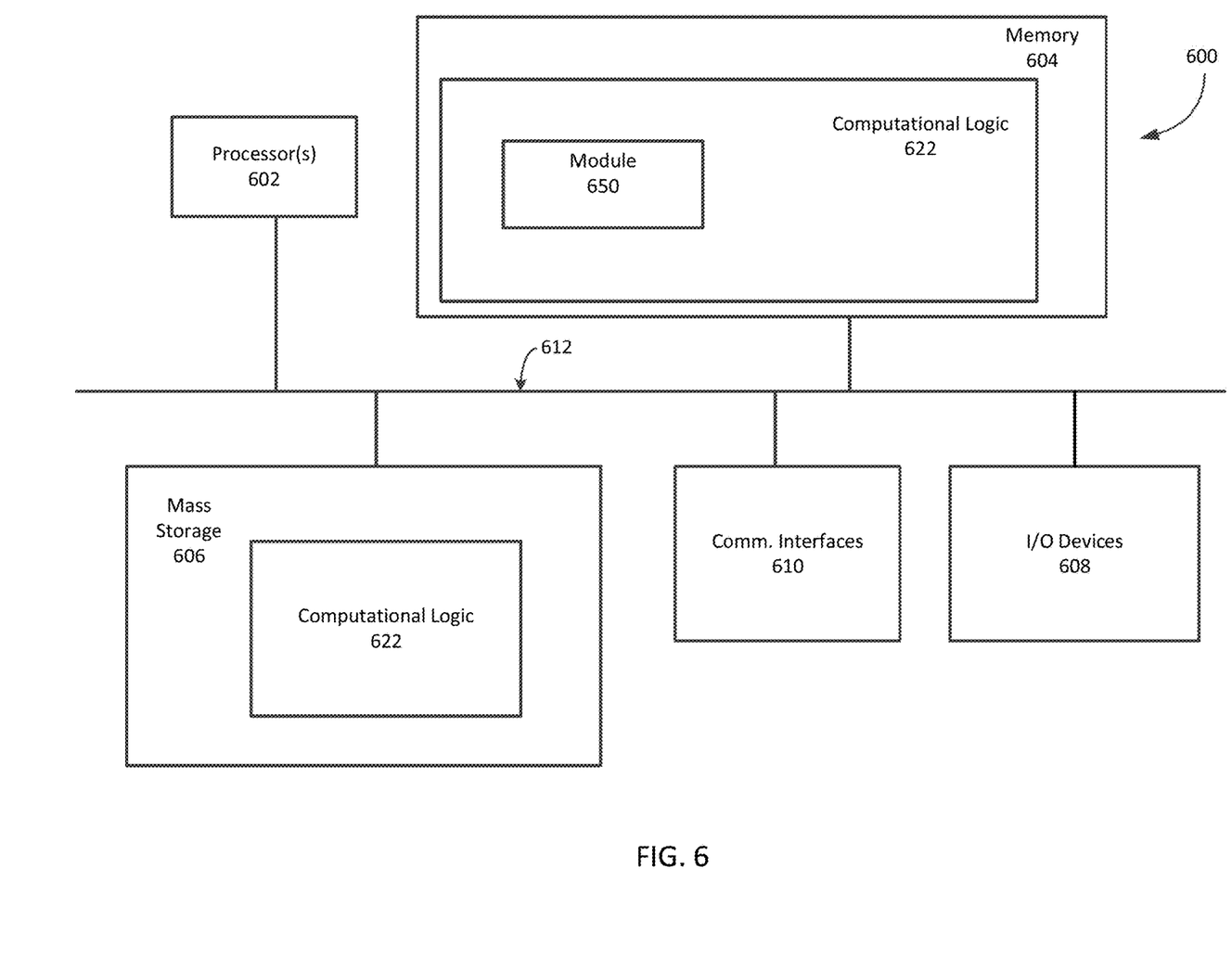
FIG. 6 illustrates an example computing device suitable for use to practice aspects of the present disclosure, in accordance with various embodiments.

FIG. 6 illustrates an example computing device 600 suitable for use to practice aspects of the present disclosure, in accordance with various embodiments. For example, the example computing device 600 may be suitable to implement the functionalities associated with diagrams 100, 200, 300, 400, and/or 500.

As shown, computing device 600 may include one or more processors 602, each having one or more processor cores, and system memory 604. The processor 602 may include any type of unicore or multi-core processors. Each processor core may include a central processing unit (CPU), and one or more levels of cache. The processor 602 may be implemented as an integrated circuit. The computing device 600 may include mass storage devices 606 (such as diskette, hard drive, volatile memory (e.g., dynamic random access memory (DRAM)), compact disc read only memory (CD-ROM), digital versatile disk (DVD) and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 600 may further include input/output (I/O) devices 608 such as a display, keyboard, cursor control, remote control, gaming controller, image capture device, one or more three-dimensional video cameras used to capture image data, and so forth, and communication interfaces 610 (such as network interface cards, modems, infrared receivers, radio receivers (e.g., Bluetooth), and so forth). I/O devices 608 may be suitable for communicative connections with three-dimensional video cameras used to capture image data, or user devices. In some embodiments, I/O devices 608 when used as user devices may include a device necessary for implementing the functionalities of receiving video image data captured by one or more cameras as described in reference to FIGS. 1-5.

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions implementing the operations and functionalities associated with some of the components of diagrams 100, 200, 300, 400, and/or 500, such as controller 206, analyzer 432, and so forth, generally shown as computational logic 622. Computational logic 622 may be implemented by assembler instructions supported by processor(s) 602 or high-level languages that may be compiled into such instructions.

System memory 604 and/or mass storage devices 606, may also include data such as data that may be found in the GPS reports 434 component or in the light pattern identifiers 435 component of FIG. 4 when implementing a vehicle location system 400. Mass storage devices 606 may also include data such as vehicle ID 216 of FIG. 2 when implementing a vehicle 202.

The computational logic 622 may contain one or more modules 650, which may perform one or more functions associated with FIGS. 1-5 and/or diagrams 100, 200, 300, 400, 500. In embodiments, when implementing a vehicle 202, module 650 may include a controller module, which may perform one or more of the functions associated with controller 206 of FIG. 2, or associated with process 300 of FIG. 3. In embodiments, when implementing a vehicle location system 400, module 650 may include an analyzer module, which may perform one or more of the functions associated with analyzer 432 of FIG. 4, or associated with process 500 of FIG. 5. Module 650 may also include a GPS reports module, which may perform one or more of the functions associated with the GPS reports 434 component of FIG. 4, or a light pattern identifiers module, which may perform one or more of the functions associated with the light pattern identifiers 435 component of FIG. 4.

The permanent copy of the programming instructions may be placed into mass storage devices 606 in the factory, or in the field, through, for example, a distribution medium (not shown), such as a compact disc (CD), or through communication interfaces 610 (from a distribution server (not shown)).

Figure 7:
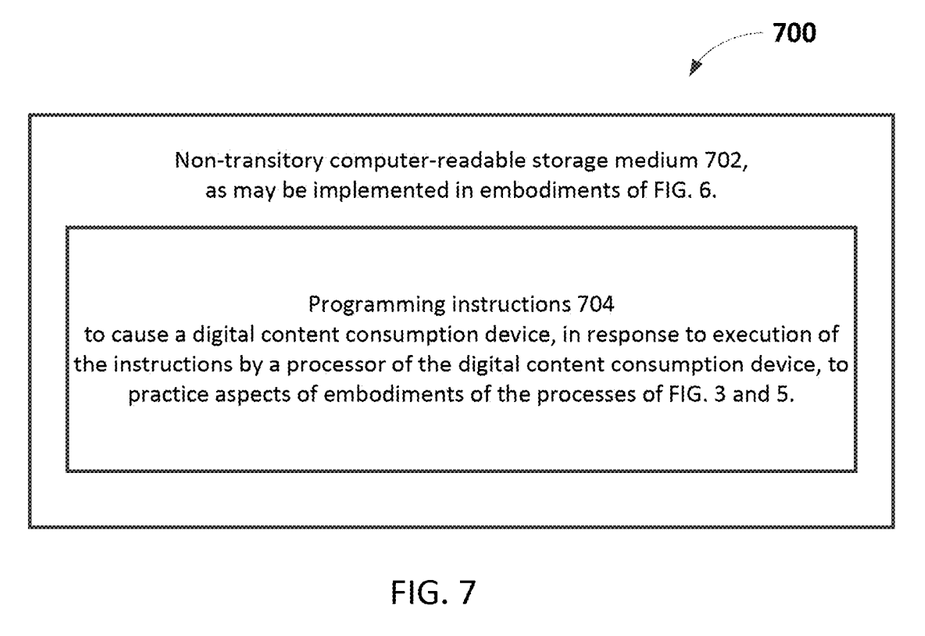
FIG. 7 illustrates an example non-transitory computer-readable storage medium having instructions configured to practice all or selected ones of the operations associated with the processes described herein.

FIG. 7 illustrates an example non-transitory computer-readable storage medium 702 having instructions configured to practice all or selected ones of the operations associated with the processes described herein. As illustrated, non-transitory computer-readable storage medium 702 may include a number of programming instructions 704 (e.g., including a controller module and a analyzer module). Programming instructions 704 may be configured to enable a device, e.g., computing device 600, in response to execution of the programming instructions, to perform one or more operations of the processes described in reference to FIGS. 1-5. In alternate embodiments, programming instructions 704 may be disposed on multiple non-transitory computer-readable storage media 702 instead. In still other embodiments, programming instructions 704 may be encoded in transitory computer-readable signals.

The corresponding structures, material, acts, and equivalents of all means or steps plus function elements in the claims below are intended to include any structure, material or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 may be an apparatus for computer-assisted or autonomous driving (CA/AD), comprising: a first control logic block, coupled with one or more light emitters disposed in a CA/AD vehicle, to control the one or more light emitters to emit a varying light pattern to provide a unique identifier for the CA/AD vehicle; and a second control logic block, coupled with a communication interface disposed in the CA/AD vehicle, to receive from a vehicle location system, external to and remote from the CA/AD vehicle, a location of the CA/AD vehicle, determined by the vehicle location system, based at least in part on the varying light pattern emitted; wherein the apparatus is disposed in the CA/AD vehicle.

Example 2 may include the apparatus of example 1, wherein the light pattern is captured by one or more video cameras external to the CA/AD vehicle for use by the vehicle location system in determination of the location of the CA/AD vehicle.

Example 3 may include the apparatus of example 1, wherein the apparatus is a controller of an on board system of the CA/AD vehicle.

Example 4 may include the apparatus of example 1, wherein the apparatus is an on board system of the CA/AD vehicle and the apparatus further comprises the communication interface, wherein the second control logic block is to transmit a representation of the varying light pattern and the identifier of the vehicle to the remote vehicle location system.

Example 5 may include the apparatus of example 4, further comprising: a global positioning system (GPS) receiver coupled with the communication interface to identify GPS coordinates of a location of the CA/AD vehicle; and wherein the second control logic block is to further transmit, via the communication interface, the identified GPS coordinates of the CA/AD vehicle to the remote vehicle location system.

Example 6 may include the apparatus of example 4, wherein the second control logic block is to further transmit, via the communication interface, an indication of the varying light pattern and a vehicle ID to the remote vehicle location system.

Example 7 may include the apparatus of example 1, wherein the second control logic block is to further receive, via the communication interface, a command for the first control logic block to control the one or more light emitters to emit the varying light pattern.

Example 8 may include the apparatus of example 1, wherein the one or more light emitters are selected one or more of infrared (IR) light emitters, visible light emitters, and ultraviolet (UV) light emitters.

Example 9 may include the apparatus of example 1, wherein the one or more light emitters are one or more headlights.

Example 10 may include the apparatus of any examples 1-9, wherein the varying light pattern is a selected one of a blinking or strobing light pattern.

Example 11 may include the apparatus of example 10, wherein the apparatus is the CA/AD vehicle further comprises at least the one or more light emitters.

Example 12 may be an apparatus for computer-assisted or autonomous driving (CA/AD), comprising: a communication interface to receive image data from one or more video cameras located in a location vicinity of a CA/AD vehicle that emits a varying light pattern that identifies the CA/AD vehicle; and an analyzer coupled to the communication interface to receive and analyze the image data; and based at least in part upon the analysis, determine a location of the CA/AD vehicle.

Example 13 may include the apparatus of example 12, wherein the analyzer, via the communication interface, is to further receive an association of a plurality of varying light patterns respectively with a plurality of CA/AD vehicles.

Example 14 may include the apparatus of example 12, wherein the analyzer, via the communication interface, is further to receive global positioning system (GPS) coordinates of the CA/AD vehicle; and wherein the analyzer is to further determine the location vicinity of the CA/AD vehicle, based upon the received GPS coordinates of the CA/AD vehicle.

Example 15 may include the apparatus of example 12, wherein the analyzer is further to identify the one or more video cameras to capture the image data of the location vicinity.

Example 16 may include the apparatus of example 12, wherein the analyzer is to analyze the received image data to: identify the varying light pattern that identifies the vehicle on the image data captured by at least a subset of the one or more video cameras; and calculate the location of the vehicle based upon the location of the varying light pattern within one or more video data frames for each of the subset of the one or more video cameras.

Example 17 may include the apparatus of example 16, wherein to calculate the location of the vehicle further includes to calculate the location of the vehicle based upon locations or orientations of the each of the subset of the one or more video cameras.

Example 18 may include the apparatus of example 12, wherein light emitted is a selected one of infrared (IR) light, visible light, and ultraviolet (UV) light.

Example 19 may include the apparatus of example 12, wherein the analyzer, via the communication interface, is further to transmit the determined location of the vehicle to the vehicle.

Example 20 may be a computer-assisted or autonomous driving (CA/AD) vehicle, comprising: one or more light emitters; a communication interface; a controller coupled to the one or more light emitters and to the communication interface, the controller including: a first control logic block to control the one or more light emitters to emit a varying light pattern to provide a unique identifier for the CA/AD vehicle; and a second control logic block to receive from a vehicle location system, external to and remote from the CA/AD vehicle, a location of the CA/AD vehicle, determined by the vehicle location system, based at least in part on the varying light pattern emitted.

Example 21 may include the CA/AD vehicle of example 20, wherein the light pattern is captured by one or more video cameras external to the CA/AD vehicle for use by the vehicle location system in determination of the location of the CA/AD vehicle.

Example 22 may include the CA/AD vehicle of example 20, wherein the second control logic block is to transmit a representation of the varying light pattern and the identifier of the vehicle to the remote vehicle location system.

Example 23 may include the CA/AD vehicle of example 20, further comprising a global positioning system (GPS)

receiver coupled with the communication interface to identify GPS coordinates of a location of the vehicle; and wherein the second control logic block is to further transmit, via the communication interface, the identified GPS coordinates of the CA/AD vehicle to the remote vehicle location system.

Example 24 may include the CA/AD vehicle of example 20, wherein the second control logic block is to further transmit, via the communication interface, an indication of the varying light pattern and a vehicle ID to the remote vehicle location system.

Example 25 may include the CA/AD vehicle of example 20, wherein the second control logic block is to further receive, via the communication interface, a command for the first control logic block to control the one or more light emitters to emit the varying light pattern.

Example 26 may include the CA/AD vehicle of example 20, wherein the one or more light emitters are selected one or more of infrared (IR) light emitters, visible light emitters, and ultraviolet (UV) light emitters.

Example 27 may include the CA/AD vehicle of example 20, wherein the one or more light emitters are one or more headlights.

Example 28 may include the CA/AD vehicle of any one of examples 20-27, wherein the varying light pattern is a selected one of a blinking or strobing light pattern.

Example 29 may be a method for computer-assisted or autonomous driving (CA/AD), comprising: transmitting, by a communication interface within a CA/AD vehicle, a GPS coordinate or identification information of the vehicle to a vehicle location system outside the CA/AD vehicle; receiving, by the communication interface, instructions from the vehicle location system to turn on one or more light emitters attached to the CA/AD vehicle; and causing, by a controller within the CA/AD vehicle, an identifying light pattern to be activated in the one or more light emitters.

Example 30 may include the method of example 29, further comprising receiving, by the communication interface, updated vehicle positioning data from the vehicle location system.

Example 31 may include the method of example 30, further comprising sending, by the communication interface, the updated vehicle positioning data to a navigation system of the CA/AD vehicle.

Example 32 may include the method of example 29, further comprising sending, by the communication interface, an indication of a varying light pattern and a vehicle ID; and wherein to turn on one or more light emitters is further to emit a varying light pattern from the one or more light emitters.

Example 33 may include the method of example 32, wherein the varying light pattern is a selected one of a blinking or strobing light pattern.

Example 34 may be one or more computer-readable media comprising instructions that cause a computing device, in response to execution of the instructions by the computing device, to: transmit a GPS coordinate or identification information of the vehicle to a vehicle location system outside the CA/AD vehicle; receive instructions from the vehicle location system to turn on one or more light emitters attached to the CA/AD vehicle; and cause an identifying light pattern to be activated in the one or more light emitters.

Example 35 may include one or more computer-readable media of example 34, wherein the instructions are further to receive updated vehicle positioning data from the vehicle location system.

Example 36 may include one or more computer-readable media of example 35, wherein the instructions are further to send the updated vehicle positioning data to a navigation system of the CA/AD vehicle.

Example 37 may include one or more computer-readable media of example 34, wherein the instructions are further to send, by the communication interface, an indication of a varying light pattern and a vehicle ID; and wherein to turn on one or more light emitters is further to emit the varying light pattern from the one or more light emitters.

Example 38 may include the method of example 37, wherein the varying light pattern is a selected one of a blinking or strobing light pattern.

Example 39 may be a computing device for computer-assisted or autonomous driving (CA/AD), comprising: means for transmitting a GPS coordinate or identification information of a CA/AD vehicle to a vehicle location system outside the CA/AD vehicle; means for receiving instructions from the vehicle location system to turn on one or more light emitters attached to the CA/AD vehicle; and means for causing an identifying light pattern to be activated in the one or more light emitters.

Example 40 may include the computing device of example 39, further comprising means for receiving updated vehicle positioning data from the vehicle location system.

Example 41 may include the computing device of example 40, further comprising means for sending the updated vehicle positioning data to a navigation system of the CA/AD vehicle.

Example 42 may include the computing device of example 39, further comprising means for sending, by the communication interface, an indication of a varying light pattern and a vehicle ID; and wherein to turn on one or more light emitters is further to emit a varying light pattern from the one or more light emitters.

Example 43 may include the computing device of example 42, wherein the varying light pattern is a selected one of a blinking or strobing light pattern.

What is claimed is:

1. An apparatus for computer-assisted or autonomous driving (CA/AD), comprising:
    a first control logic block, coupled with one or more light emitters disposed in a CA/AD vehicle, to control the one or more light emitters to emit a varying light pattern to provide a unique identifier for the CA/AD vehicle; and
    a second control logic block, coupled with a communication interface disposed in the CA/AD vehicle, to receive from a vehicle location system, external to and remote from the CA/AD vehicle, a location of the CA/AD vehicle, determined by the vehicle location system, based at least in part on the varying light pattern emitted;
    wherein the apparatus is disposed in the CA/AD vehicle.

2. The apparatus of claim 1, wherein the light pattern is captured by one or more video cameras external to the CA/AD vehicle for use by the vehicle location system in determination of the location of the CA/AD vehicle.

3. The apparatus of claim 1, wherein the apparatus is a controller of an on board system of the CA/AD vehicle.

4. The apparatus of claim 1, wherein the apparatus is an on board system of the CA/AD vehicle and the apparatus further comprises the communication interface, wherein the second control logic block is to transmit a representation of the varying light pattern and the identifier of the vehicle to the remote vehicle location system.

5. The apparatus of claim 4, further comprising:
a global positioning system (GPS) receiver coupled with the communication interface to identify GPS coordinates of a location of the CA/AD vehicle; and
wherein the second control logic block is to further transmit, via the communication interface, the identified GPS coordinates of the CA/AD vehicle to the remote vehicle location system.

6. The apparatus of claim 4, wherein the second control logic block is to further transmit, via the communication interface, an indication of the varying light pattern and a vehicle ID to the remote vehicle location system.

7. The apparatus of claim 1, wherein the second control logic block is to further receive, via the communication interface, a command for the first control logic block to control the one or more light emitters to emit the varying light pattern.

8. The apparatus of claim 1, wherein the one or more light emitters are selected one or more of infrared (IR) light emitters, visible light emitters, and ultraviolet (UV) light emitters.

9. A method for computer-assisted or autonomous driving (CA/AD), comprising:
transmitting, by a communication interface within a CA/AD vehicle, a GPS coordinate or identification information of the vehicle to a vehicle location system outside the CA/AD vehicle;
receiving, by the communication interface, instructions from the vehicle location system to turn on one or more light emitters attached to the CA/AD vehicle; and
causing, by a controller within the CA/AD vehicle, an identifying light pattern to be activated in the one or more light emitters.

10. The method of claim 9, further comprising receiving, by the communication interface, updated vehicle positioning data from the vehicle location system.

* * * * *